US012317931B2

(12) United States Patent
Park

(10) Patent No.: US 12,317,931 B2
(45) Date of Patent: Jun. 3, 2025

(54) AEROSOL GENERATING DEVICE AND AEROSOL GENERATING SYSTEM

(71) Applicant: KT&G CORPORATION, Daejeon (KR)

(72) Inventor: Sang Kyu Park, Seoul (KR)

(73) Assignee: KT&G CORPORATION, Daejeon (KR)

( * ) Notice: Subject to any disclaimer, the term of this patent is extended or adjusted under 35 U.S.C. 154(b) by 105 days.

(21) Appl. No.: 17/779,004

(22) PCT Filed: Aug. 17, 2021

(86) PCT No.: PCT/KR2021/010861
§ 371 (c)(1),
(2) Date: May 23, 2022

(87) PCT Pub. No.: WO2022/059930
PCT Pub. Date: Mar. 24, 2022

(65) Prior Publication Data

US 2023/0346032 A1 Nov. 2, 2023

(30) Foreign Application Priority Data

Sep. 16, 2020 (KR) ........................ 10-2020-0119329

(51) Int. Cl.

| | |
|---|---|
| ***A24F 40/465*** | (2020.01) |
| ***A24F 40/20*** | (2020.01) |
| ***A24F 40/51*** | (2020.01) |
| ***A24F 40/57*** | (2020.01) |
| ***H05B 6/06*** | (2006.01) |
| ***H05B 6/10*** | (2006.01) |

(52) U.S. Cl.
CPC ............ *A24F 40/465* (2020.01); *A24F 40/20* (2020.01); *A24F 40/51* (2020.01); *A24F 40/57* (2020.01); *H05B 6/06* (2013.01); *H05B 6/105* (2013.01)

(58) Field of Classification Search
None
See application file for complete search history.

(56) References Cited

U.S. PATENT DOCUMENTS

| | | | |
|---|---|---|---|
| 9,717,277 | B2 | 8/2017 | Mironov |
| 10,945,456 | B2 | 3/2021 | Mironov et al. |
| 11,212,881 | B2 | 12/2021 | Fursa et al. |

(Continued)

FOREIGN PATENT DOCUMENTS

| | | | |
|---|---|---|---|
| CA | 3 002 601 | A1 | 4/2017 |
| CN | 110476477 | A | 11/2019 |

(Continued)

OTHER PUBLICATIONS

International Search Report of PCT/KR2021/010861 dated Dec. 21, 2021 [PCT/ISA/210].

(Continued)

*Primary Examiner* — Linda L Gray
(74) *Attorney, Agent, or Firm* — Sughrue Mion, PLLC

(57) ABSTRACT

An aerosol generating device includes: a susceptor configured to be inserted into an aerosol generating substrate; a first coil configured to induce heat in the susceptor by induction heating; a second coil having a resonance frequency which varies according to a change in a temperature of the susceptor; and a controller configured to calculate the temperature of the susceptor on the basis of a change in the resonance frequency of the second coil.

14 Claims, 16 Drawing Sheets

(56) References Cited

U.S. PATENT DOCUMENTS

| | | | |
|---|---|---|---|
| 2016/0150825 | A1 | 6/2016 | Mironov et al. |
| 2018/0325179 | A1 | 11/2018 | Li et al. |
| 2019/0191767 | A1 | 6/2019 | Wu et al. |
| 2019/0230987 | A1 | 8/2019 | Wu et al. |
| 2020/0022412 | A1 | 1/2020 | Abi Aoun et al. |
| 2020/0221772 | A1 | 7/2020 | Mironov et al. |
| 2020/0397035 | A1 | 12/2020 | Lee et al. |
| 2021/0007393 | A1 | 1/2021 | Jung et al. |
| 2021/0093009 | A1 | 4/2021 | Park et al. |
| 2021/0145067 | A1 | 5/2021 | Bleloch et al. |

FOREIGN PATENT DOCUMENTS

| | | | |
|---|---|---|---|
| CN | 110679202 | A | 1/2020 |
| CN | 110913713 | A | 3/2020 |
| CN | 211482972 | U | 9/2020 |
| EP | 3 613 258 | A1 | 2/2020 |
| EP | 3 900 552 | A1 | 10/2021 |
| JP | 2020-516014 | A | 5/2020 |
| JP | 2020-108369 | A | 7/2020 |
| JP | 2020-526181 | A | 8/2020 |
| JP | 2020526865 | A | 8/2020 |
| KR | 10-1648324 | B1 | 8/2016 |
| KR | 10-2018-0069895 | A | 6/2018 |
| KR | 10-2019-0076892 | A | 7/2019 |
| KR | 10-2019-0084952 | A | 7/2019 |
| KR | 10-2019-0130021 | A | 11/2019 |
| KR | 10-2020-0061233 | A | 6/2020 |
| KR | 10-2020-0068449 | A | 6/2020 |
| KR | 10-2020-0071391 | A | 6/2020 |
| KR | 10-2020-0078410 | A | 7/2020 |
| WO | 2015/177256 | A1 | 11/2015 |
| WO | 2018/195335 | A1 | 10/2018 |
| WO | 2019/030366 | A1 | 2/2019 |
| WO | 2020-020970 | A1 | 1/2020 |

OTHER PUBLICATIONS

Written Opinion of PCT/KR2021/010861 dated Dec. 21, 2021 [PCT/ISA/237].

Office Action issued Jun. 13, 2023 in Japanese Application No. 2022-545957.

Office Action issued Jun. 28, 2022 in Korean Application No. 10-2020-0119329.

Office Action issued Aug. 2, 2022 in Korean Application No. 10-2022-0083489.

Communication dated Oct. 31, 2023 issued by the Japanese Patent Office in application No. 2022-545957.

Extended European Search Report dated Nov. 15, 2022 in European Application No. 21869553.4.

First Office Action issued in The State Intellectual Property Office of People's Republic of China in corresponding CN Patent Application No. 202180009437.X on Apr. 1, 2025.

AEROSOL GENERATING DEVICE AND AEROSOL GENERATING SYSTEM

CROSS REFERENCE TO RELATED APPLICATIONS

This application is a National Stage of International Application No. PCT/KR2021/010861, filed Aug. 17, 2021, claiming priority to Korean Patent Application No. 10-2020-0119329, filed Sep. 16, 2020.

TECHNICAL FIELD

One or more embodiments relate to an aerosol generating device and an aerosol generating system, and more particularly, to an aerosol generating device capable of accurately measuring the temperature of a heating unit by a non-contact method.

BACKGROUND ART

Recently, the demand for alternative methods of overcoming the shortcomings of general cigarettes has increased. For example, there is growing demand for an aerosol generating device that generates an aerosol by heating an aerosol generating material in cigarettes or liquid storages, instead of combusting cigarettes.

Notably, there have been proposed new heating methods different from a conventional method of heating a cigarette by arranging a heater formed of an electrical resistor, inside or outside the cigarette accommodated in an aerosol generating device and supplying power to the heater. In particular, studies on a method of heating a cigarette by induction heating have been actively conducted.

In an induction heating method, the temperature of a susceptor may be measured by directly attaching a temperature sensor to the inside or outside of the susceptor. However, in such a contact-type temperature detection method, a temperature sensor is arranged in contact with a susceptor. Therefore, there is a risk of damage to the temperature sensor due to heating of the susceptor. In addition, in the contact-type temperature detection method, power efficiency is lower than in a non-contact method.

In order to address these problems, a temperature of a susceptor may be detected by a non-contact method.

DISCLOSURE

Technical Problem

In an existing non-contact detection method using the Curie temperature, the performance of a temperature sensor may vary according to the physical properties of a susceptor. In addition, an existing method of measuring an ambient temperature of a susceptor and inferring the temperature of the susceptor via the ambient temperature of the susceptor is inaccurate, and a temperature detection speed is low.

The technical problems of the present disclosure are not limited to those described above, and other technical problems may be inferred from the following examples.

Technical Solution

According to one or more embodiments, an aerosol generating device includes: a susceptor configured to be inserted into an aerosol generating substrate; a first coil configured to induce heat in the susceptor by induction heating; a second coil having a resonance frequency which varies according to a change in a temperature of the susceptor; and a controller configured to calculate the temperature of the susceptor based on a change in the resonance frequency of the second coil.

According to one or more embodiments, an aerosol generating device includes: a susceptor configured to be inserted into an aerosol generating substrate; a coil configured to induce heat in the susceptor by induction heating and have a resonance frequency which varies according to a change in a temperature of the susceptor; and a controller configured to calculate the temperature of the susceptor based on a change in the resonance frequency of the coil.

According to one or more embodiments, an aerosol generating system includes an aerosol generating substrate including a susceptor; and an aerosol generating device including: an induction heating unit configured to heat the susceptor by induction heating and have a resonance frequency which varies according to a change in a temperature of the susceptor; and a controller configured to calculate the temperature of the susceptor based on a change in the resonance frequency of the induction heating unit.

Advantageous Effects

An aerosol generating device according to one or more embodiments measures the temperature of a susceptor by a non-contact method. Therefore, compared to a contact-type temperature detection method, the risk of damage to a temperature sensor is significantly reduced.

Also, the aerosol generating device according to one or more embodiments measures the temperature of the susceptor in the non-contact method, and thus, power efficiency is significantly increased compared to the contact-type temperature detection method.

In addition, the aerosol generating device according to one or more embodiments measures the temperature of the susceptor on the basis of a change in a resonance frequency of a coil, rather than physical properties of the susceptor, and thus, the temperature of the susceptor may be accurately measured.

Moreover, the aerosol generating device according to one or more embodiments measures the temperature of the susceptor on the basis of the change in the resonance frequency of the coil, rather than an ambient temperature of the susceptor, and thus, the temperature of the susceptor may be accurately measured.

The advantageous effects of the present disclosure are not limited to the above-described effects, and unmentioned effects may be clearly understood by one of ordinary skill in the art from the description, claims, and accompanying drawings.

BEST MODE

Figure 1:
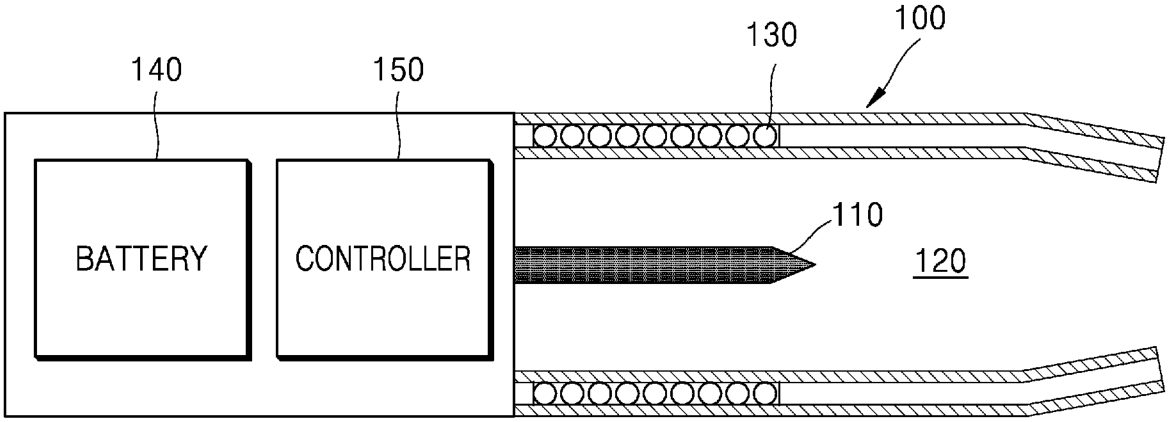
FIGS. 1 and 2 are diagrams illustrating an induction heating-type aerosol generating device.

According to one or more embodiments, an aerosol generating device includes: a susceptor configured to be inserted into an aerosol generating substrate; a first coil configured to induce heat in the susceptor by induction heating; a second coil having a resonance frequency which varies according to a change in a temperature of the susceptor; and a controller configured to calculate the temperature of the susceptor based on a change in the resonance frequency of the second coil.

The controller may sweep a driving frequency of the second coil within a preset frequency range and detect a change in the resonance frequency of the second coil on the basis of a result of sweeping the driving frequency.

The controller may calculate the temperature of the susceptor on the basis of a difference between a first resonance frequency of the second coil detected at a first time point and a second resonance frequency detected at a second time point.

A first frequency range for driving the first coil may be different from a second frequency range for driving the second coil.

A lower limit of the first frequency range may be higher than an upper limit of the second frequency range.

The susceptor may protrude from a bottom of an accommodation space in which the aerosol generating substrate is accommodated, and the first coil and the second coil may surround the accommodation space.

The first coil and the second coil may be alternately wound in a longitudinal direction of the accommodation space.

The first coil and the second coil may surround different portions of the accommodation space.

According to one or more embodiments, an aerosol generating device includes: a susceptor configured to be inserted into an aerosol generating substrate; a coil configured to induce heat in the susceptor by induction heating and have a resonance frequency which varies according to a change in a temperature of the susceptor; and a controller configured to calculate the temperature of the susceptor based on a change in the resonance frequency of the coil.

The controller may control the coil based on a preset control period, wherein the preset control period includes a heating section for heating the susceptor by controlling the coil within a first frequency range and a detection section for detecting a change in the resonance frequency of the coil by controlling the coil within a second frequency range that is different from the first frequency range.

The controller may sweep a driving frequency of the coil within a preset frequency range and detect a change in the resonance frequency of the coil on the basis of a result of sweeping the driving frequency The controller may calculate the temperature of the susceptor on the basis of a difference between a first resonance sonant frequency of the coil detected at a first time point and a second resonance frequency detected at a second time point.

A first frequency range for driving the coil in a heating section may be the same as a second frequency range for driving the coil in a detection section.

The susceptor may protrude from a bottom of an accommodation space in which the aerosol generating substrate is accommodated, and the coil surrounds an outer surface of the accommodation space.

According to one or more embodiments, an aerosol generating system includes an aerosol generating substrate comprising a susceptor; and an aerosol generating device comprising: an induction heating unit configured to heat the susceptor by induction heating and have a resonance frequency which varies according to a change in a temperature of the susceptor; and a controller configured to calculate the temperature of the susceptor based on a change in the resonance frequency of the induction heating unit.

[Mode for Invention]

With respect to the terms in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word “comprise” and variations such as “comprises” or “comprising” will be understood to imply the inclusion of stated elements but not the exclusion of any other elements. In addition, the terms “-er”, “-or”, and “module” described in the specification mean units for processing at least one function and operation and can be implemented by hardware components or software components and combinations thereof.

The terms including ordinal numbers such as “first” and “second” may be used to describe various elements, but the elements are not limited by the terms. The terms are used only for the purpose of distinguishing one element from another element.

As used herein, expressions such as “at least one of,” when preceding a list of elements, modify the entire list of elements and do not modify the individual elements of the list. For example, the expression, “at least one of a, b, and c,” should be understood as including only a, only b, only c, both a and b, both a and c, both b and c, or all of a, b, and c.

It will be understood that when an element or layer is referred to as being “over,” “above,” “on,” “connected to” or “coupled to” another element or layer, it can be directly over, above, on, connected or coupled to the other element or layer or intervening elements or layers may be present. In contrast, when an element is referred to as being “directly over,” “directly above,” “directly on,” “directly connected to” or “directly coupled to” another element or layer, there are no intervening elements or layers present. Like numerals refer to like elements throughout.

The term “aerosol generating article” may refer to any article that is designed for smoking by a person puffing on the aerosol generating article. The aerosol generating article may include an aerosol generating material that generates aerosols when heated even without combustion. For example, one or more aerosol generating articles may be loaded in an aerosol generating device and generate aerosols when heated by the aerosol generating device. The shape, size, material, and structure of the aerosol generating article may differ according to embodiments. Examples of the aerosol generating article may include, but are not limited to, a cigarette-shaped substrate and a cartridge. Hereinafter, the term "cigarette" (i.e., when used alone without a modifier such as "general," "traditional," or "combustive") may refer to an aerosol generating article which has a shape and a size similar to those of a traditional combustive cigarette.

Hereinafter, embodiments of the present disclosure will be described in detail with reference to the accompanying drawings so that one of ordinary skill in the art may easily implement the embodiments of the present disclosure. However, the present disclosure may be implemented in various different forms and is not limited to the embodiments described herein.

Hereinafter, one or more embodiments will be described in detail with reference to the accompanying drawings.

Figure 2:
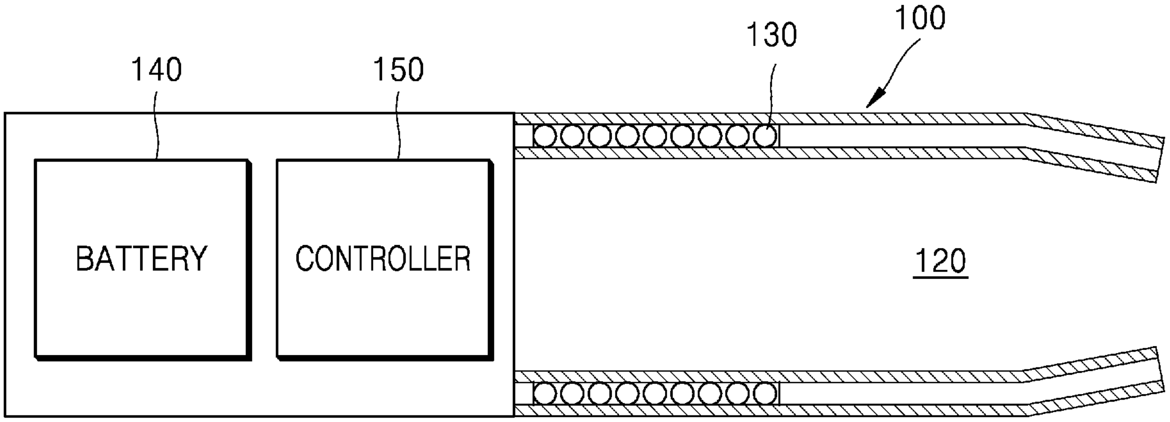

FIGS. 1 and 2 are diagrams illustrating an induction heating-type aerosol generating device.

Referring to FIG. 1, an aerosol generating device 100 may include a susceptor 110, an accommodation space 120, an induction heating unit 130, a battery 140, and a controller 150. According to one or more embodiments, the susceptor 110 may be a component included in a cigarette 200 (see FIGS. 3 and 4). In this case, as shown in FIG. 2, the aerosol generating device 100 may not include the susceptor 110.

The aerosol generating device 100 illustrated in FIGS. 1 and 2 includes components particularly related to the present embodiment. Accordingly, it may be understood by one of ordinary skill in the art that, in addition to the components illustrated in FIGS. 1 and 2, other components may be further included in the aerosol generating device 100.

The aerosol generating device 100 may generate an aerosol by heating the cigarette 200 accommodated in the aerosol generating device 100 by using an induction heating method. The induction heating method may refer to a method of generating heat from a magnetic material by applying an alternating magnetic field having a periodically changing direction to the magnetic material that generates heat by an external magnetic field.

When the alternating magnetic field is applied to the magnetic material, energy loss due to eddy current loss and hysteresis loss may occur in the magnetic material, and the lost energy may be emitted as heat energy from the magnetic material. As the amplitude or frequency of the alternating magnetic field applied to the magnetic material increases, a larger amount of heat energy may be emitted from the magnetic material. The aerosol generating device 100 may emit heat energy from the magnetic material by applying the alternating magnetic field to the magnetic material and the heat energy emitted from the magnetic material may be transferred to the cigarette 200.

The magnetic material that generates heat by the external magnetic field may be the susceptor 110. The susceptor 110 may have a shape such as a piece, a flake, or a strip.

The susceptor 110 may include metal or carbon. The susceptor 110 may include at least one of ferrite, a ferromagnetic alloy, stainless steel, and aluminum (Al). In addition, the susceptor 110 may include at least one of graphite, molybdenum, silicon carbide, niobium, a nickel alloy, a metal film, ceramic such as zirconia, a transition metal such as nickel (Ni) or cobalt (Co), and a metalloid such as boron (B) or phosphorous (P).

The aerosol generating device 100 may include the accommodation space 120 for accommodating the cigarette 200. The accommodation space 120 may have an opening through which the cigarette 200 is inserted into the accommodation space 120 from the outside of the aerosol generating device 100.

As shown in FIG. 1, the susceptor 110 may be arranged at the inner end of the accommodation space 120. The susceptor 110 may be attached to a bottom surface formed at an inner end portion of the accommodation space 120. The cigarette 200 may be pressed down to the bottom surface of the accommodation space 120 such that the susceptor 110 is inserted into the cigarette 200.

In one or more embodiments, as shown in FIG. 2, the aerosol generating device 100 may not include the susceptor 110. In this case, the susceptor 110 may be included in the cigarette 200.

The aerosol generating device 100 may include the induction heating unit 130 that applies an alternating magnetic field to the susceptor 110 and has a resonance frequency varying according to a change in the temperature of the susceptor 110 due to induction heating of the susceptor 110. The induction heating unit 130 may include at least one coil.

The coil may be implemented as a solenoid. The coil may be a solenoid that is wound around a side of the accommodation space 120, and the cigarette 200 may be accommodated in an inner space of the solenoid. A material of a conducting wire constituting the solenoid may be copper (Cu). However, the material is not limited thereto, and an alloy including any one or at least one of silver (Ag), gold (Au), aluminum (Al), tungsten (W), zinc (Zn), and nickel (Ni), which are materials having a low resistivity value and thus allow high current to flow through the coil, may be the material of the conducting wire constituting the solenoid.

The coil may be wound around an outer surface of the accommodation space 120 and may be arranged at a location corresponding to the susceptor 110. The arrangement of the coil will be described later with reference to FIGS. 7A through 7C.

The battery 140 may supply power to the induction heating unit 130. The battery 140 may be a lithium iron phosphate ($LiFePO_4$) battery but is not limited thereto. For example, the battery 140 may be a lithium cobalt oxide ($LiCoO_2$) battery, a lithium titanate battery, or the like.

The controller 150 may control power supplied to the induction heating unit 130. When the induction heating unit 130 includes a plurality of coils, the controller 150 may vary the driving frequencies of the coils to control induction heating of the susceptor 110. In addition, the controller 150 may detect a resonance frequency of the coil, which varies due to induction heating of the susceptor 110, and calculate the temperature of the susceptor 110 on the basis of the detected resonance frequency. The induction heating method and the temperature calculation method of the controller 150 will be described later with reference to FIGS. 8 through 14.

Figure 3:
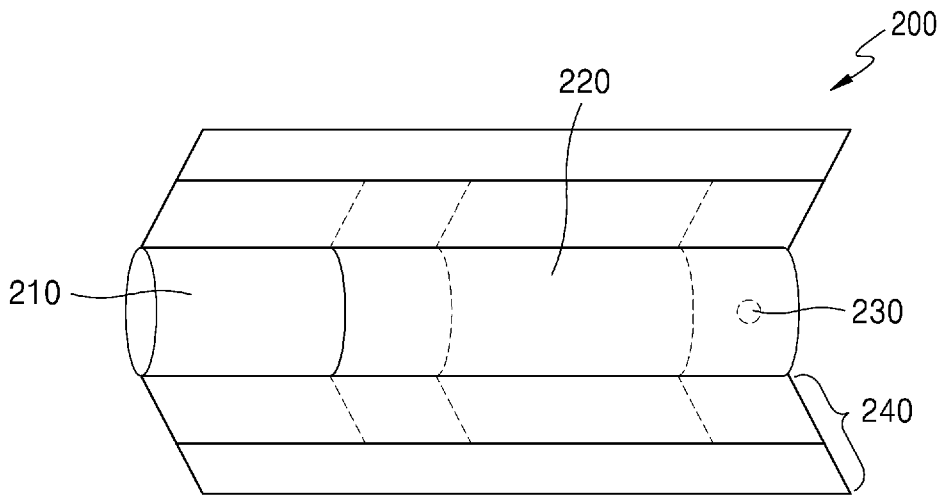
FIGS. 3 and 4 are views illustrating examples of a cigarette.
Figure 4:
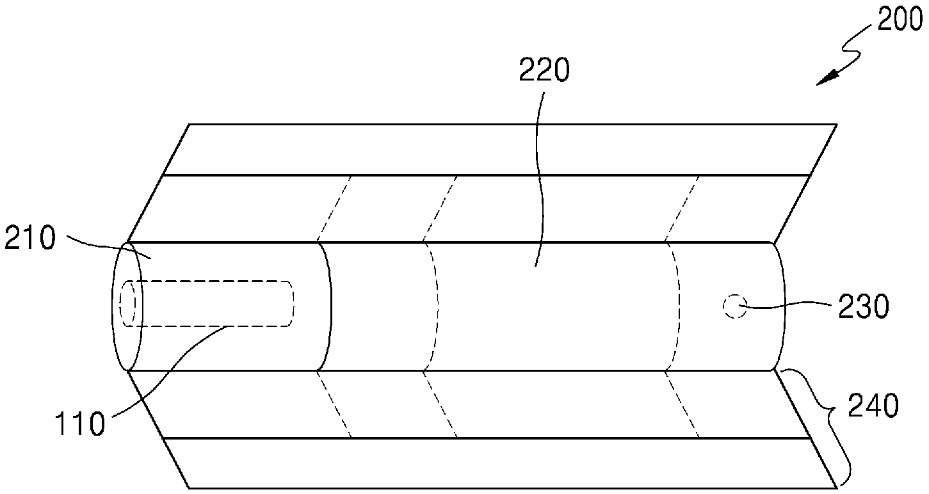

FIGS. 3 and 4 are views illustrating examples of a cigarette.

Referring to FIGS. 3 and 4, a cigarette 200 may include a tobacco rod 210 and a filter rod 220. FIGS. 3 and 4 illustrate that the filter rod 220 only includes a single segment. However, the filter rod 220 is not limited thereto and may include a plurality of segments. For example, the filter rod 220 may include a first segment for cooling an aerosol and a second segment for filtering a particular component included in the aerosol. In addition, the filter rod 220 may further include multiple segments for performing different functions.

The cigarette 200 may be packaged by at least one wrapper 240. The wrapper 240 may have at least one hole through which external air may be introduced or internal air may be discharged. For example, the cigarette 200 may be packaged by one wrapper 240. As another example, the cigarette 200 may be doubly packaged by at least two wrappers 240. In detail, the tobacco rod 210 may be packaged by a first wrapper, and the filter rod 220 may be packaged by a second wrapper. The tobacco rod 210 and the filter rod 220, which are respectively packaged by separate wrappers, may be coupled to each other, and the entire cigarette 200 may be packaged by a third wrapper.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but is not limited thereto. The tobacco rod 210 may include other additives, such as flavors, a wetting agent, and/or organic acid. The tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. In one or more embodiments, the tobacco rod 210 may be mad of pipe tobacco, which is formed of tiny bits cut from a tobacco sheet.

According to one or more embodiments, the cigarette 200 may further include the susceptor 110 In this case, as shown in FIG. 4, the susceptor 110 may be arranged in the tobacco rod 210. The susceptor 110 may extend from an end of the tobacco rod 210 toward the filter rod 220.

The tobacco rod 210 may be surrounded by a heat-conducting material. For example, the heat-conducting material may be, but is not limited to, a metal foil such as an aluminum foil. The heat-conducting material surrounding the tobacco rod 210 may uniformly distribute heat transmitted to the tobacco rod 210 to improve the heat conductivity applied to the tobacco rod 210, thereby improving the taste of an aerosol generated from the tobacco rod 210.

The filter rod 220 may include a cellulose acetate filter. The filter rod 220 may have various shapes. For example, the filter rod 220 may include a cylinder-type rod or a tube-type rod having a hollow inside. In one or more embodiments, the filter rod 220 may include a recess-type rod having a cavity inside. When the filter rod 220 includes a plurality of segments, the plurality of segments may have different shapes.

The filter rod 220 may be formed to generate flavors therefrom. For example, a flavoring liquid may be injected onto the filter rod 220, or an additional fiber coated with a flavoring liquid may be inserted into the filter rod 220.

The filter rod 220 may include at least one capsule 230. The capsule 230 may generate a flavor or an aerosol. For example, the capsule 230 may have a configuration in which a liquid containing a flavoring material is wrapped with a film. The capsule 230 may have a spherical or cylindrical shape but is not limited thereto.

When the filter rod 220 includes a cooling segment configured to cool the aerosol, the cooling segment may include a polymer material or a biodegradable polymer material. For example, the cooling segment may include pure polylactic acid alone. In some embodiments, the cooling segment may include a cellulose acetate filter having a plurality of perforations. However, the cooling segment is not limited thereto and may include a structure and material that cool an aerosol.

Figure 5:
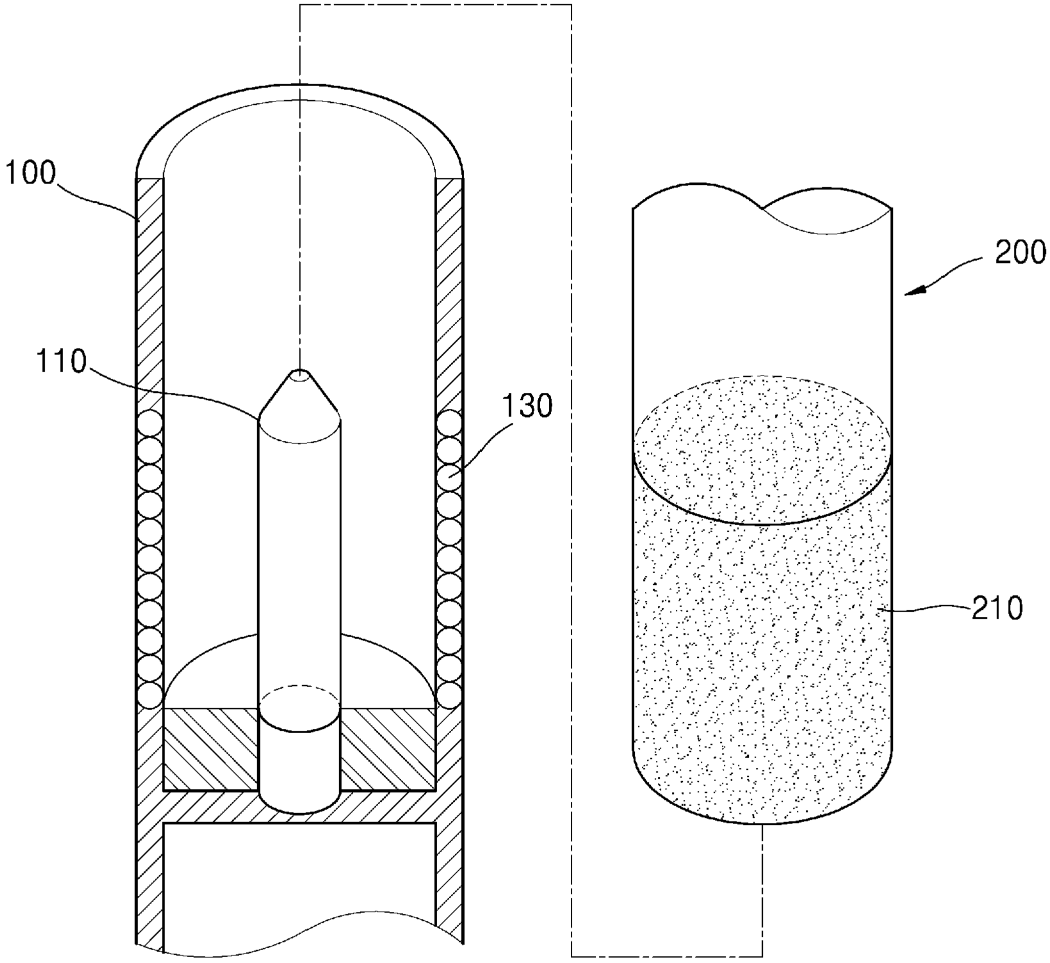
FIGS. 5 and 6 are views illustrating examples of a cigarette inserted into an aerosol generating device.
Figure 6:
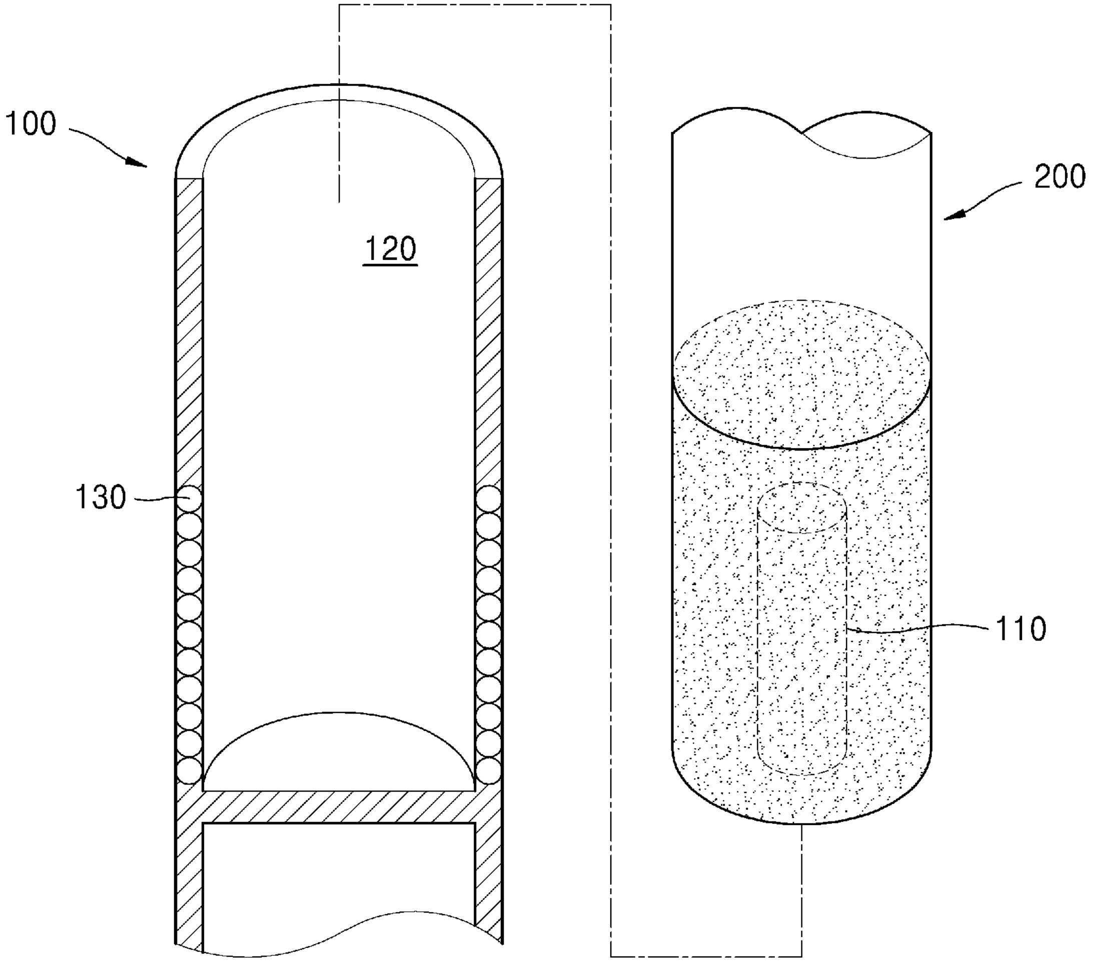

FIGS. 5 and 6 are views illustrating examples of a cigarette inserted into an aerosol generating device.

In more detail, FIG. 5 is a view illustrating an example of a cigarette 200 inserted into an aerosol generating device 100 when a susceptor 110 is arranged in the aerosol generating device 100. FIG. 6 is a view illustrating an example of a cigarette 200 inserted into an aerosol generating device 100 when a susceptor 110 is arranged in the cigarette 200.

Referring to FIG. 5, the cigarette 200 may be inserted in an accommodation space in a longitudinal direction of the cigarette 200 such that the susceptor 110 is inserted into the cigarette 200. As the susceptor 110 is inserted into the cigarette 200, a tobacco rod 210 may contact the susceptor 110. The susceptor 110 may have a structure extending in a longitudinal direction of the aerosol generating device 100 to be inserted into the cigarette 200.

The susceptor 110 may be located in the center of the accommodation space 120 to be inserted into the center of the cigarette 200. FIG. 5 illustrates the single susceptor 110, but the susceptor 110 is not limited thereto. In other words, the aerosol generating device 100 of the present disclosure may include a plurality of susceptors 110 that extend in the longitudinal direction of the aerosol generating device 100 to be inserted into the cigarette 200 and are arranged in parallel with each other.

An induction heating unit 130 may include at least one coil, and the coil may be wound around the accommodation space 120 and extend in the longitudinal direction of the accommodation space 120. The coil may extend to a length corresponding to the susceptor 110 in the longitudinal direction such that the coil is positioned around the susceptor 110.

Referring to FIG. 6, the cigarette 200 may be inserted in the accommodation space 120 in the longitudinal direction of the cigarette 200. When the cigarette 200 is accommodated in the accommodation space 120, the susceptor 110 may be surrounded by the induction heating unit 130.

The susceptor 110 may be in the center of the tobacco rod 210 to uniformly transfer heat. FIG. 6 illustrates the single susceptor 110, but the susceptor 110 is not limited thereto. In other words, the aerosol generating device 100 of the present disclosure may also include a plurality of susceptors 110 included in the cigarette 200.

The induction heating unit 130 may include at least one coil, and the coil may be wound around the accommodation space 120 and extend in the longitudinal direction. The coil may extend to a length corresponding to the susceptor 110 in the longitudinal direction and may be arranged at a location corresponding to the susceptor 110.

Figure 7A:
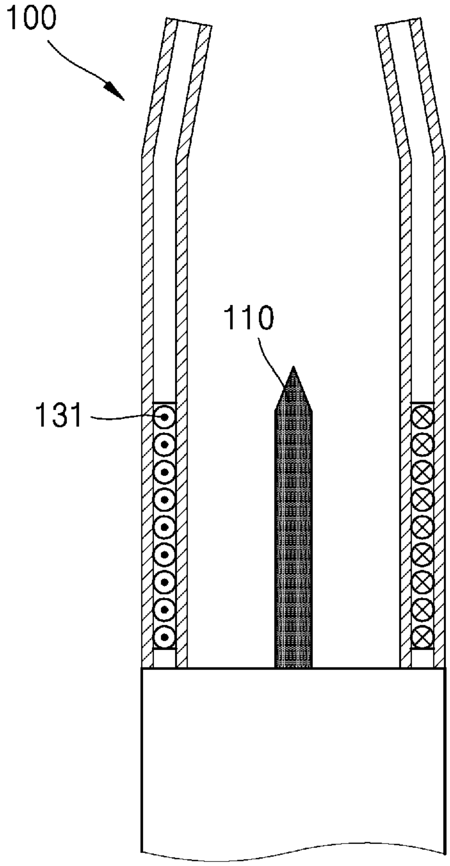
FIGS. 7A, 7B, and 7C are views illustrating methods of winding a coil.
Figure 7B:
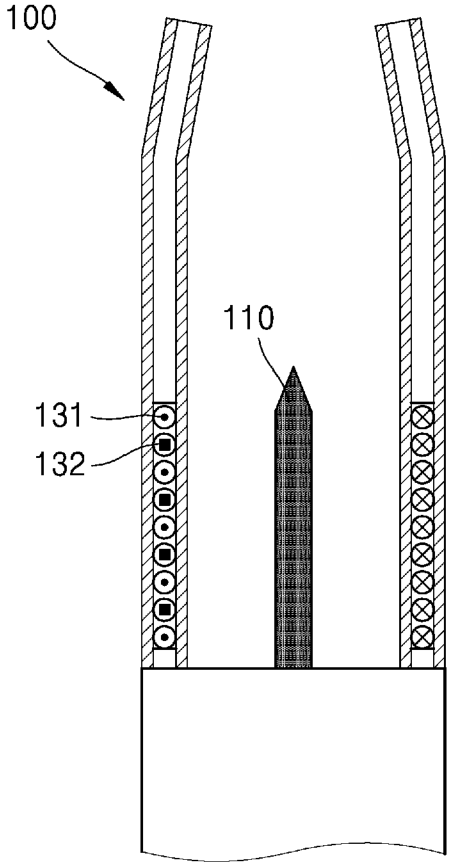
Figure 7C:
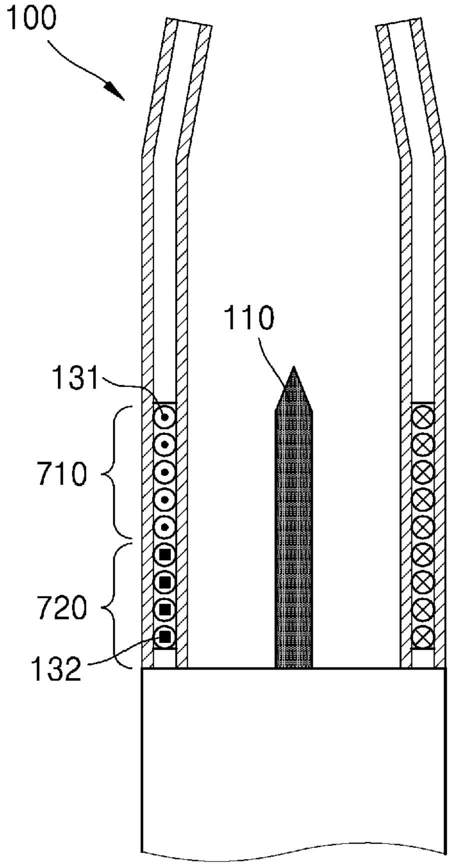

FIGS. 7A, 7B, and 7C are views illustrating methods of winding a coil.

In FIG. 7A, the induction heating unit 130 only includes a single coil. On the other hand, in FIGS. 7B and 7C, the induction heating unit 130 includes the plurality of coils.

As shown in FIGS. 7A, 7B, and 7C, an inner surface of the accommodation space 120 refers to an area in contact with an area into which the cigarette 200 is inserted, and an outer surface of the accommodation space 120 refers to a direction opposite to the inner surface. Also, a longitudinal direction of an aerosol generating device 100 may refer to a direction perpendicular to an end surface of the accommodation space 120 into which the cigarette 200 is inserted.

As shown in FIG. 7A, the induction heating unit 130 may include a single coil 131. The coil 131 may be wound around the outer surface of the accommodation space 120 in the longitudinal direction of the aerosol generating device 100. The length of the coil 131 in the longitudinal direction may correspond to a length of the susceptor 110. As shown in FIG. 7A, when the aerosol generating device 100 includes a single coil 131 for measuring the temperature of the susceptor 110, manufacturing convenience may be increased.

As shown in FIG. 7B, the induction heating unit 130 may further include a second coil 132. The first coil 131 and the second coil 132 may be alternately wound around the outer surface of the accommodation space 120 in the longitudinal direction.

Alternatively, as shown in FIG. 7C, the first coil 131 may be wound around a first area 710 of the accommodation space 120, and the second coil 132 may be wound around a second area 720 of the accommodation space 120 that is different from the first area 710.

As shown in FIGS. 7B and 7C, when the aerosol generating device 100 includes a plurality of coils (e.g., the first coil 131 and the second coil 132), the aerosol generating device 100 may continuously heat the susceptor 110 via the first coil 131 and measure the temperature of the susceptor 110 via the second coil 132 in real time.

Figure 8:
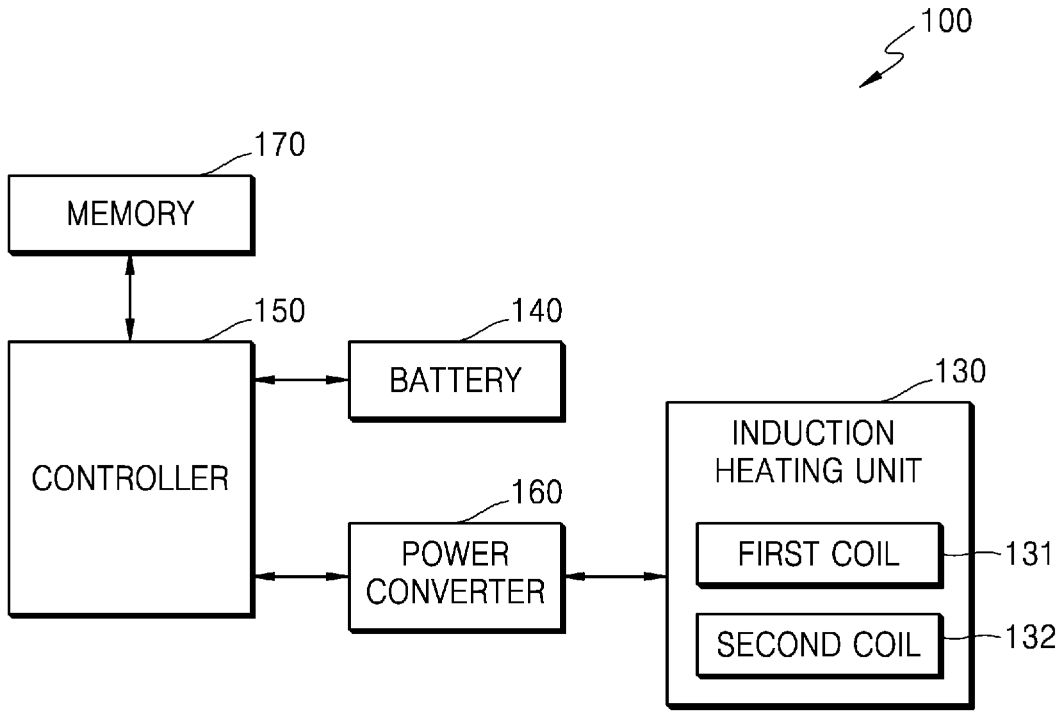
FIG. 8 is an internal block diagram of an aerosol generating device according to one or more embodiments.

FIG. 8 is an internal block diagram of an aerosol generating device according to one or more embodiments.

Referring to FIG. 8, an aerosol generating device 100 may include a battery 140, a power converter 160, an induction heating unit 130, a memory 170, and a controller 150. The induction heating unit 130, the battery 140, and the controller 150 of FIG. 8 may correspond to the induction heating unit 130, the battery 140, and the controller 150 of FIGS. 1 and 2, respectively. Also, although not shown in FIG. 8, the susceptor 110 may be included in the aerosol generating device 100.

The battery 140 may supply power to internal components of the aerosol generating device 100. The battery 140 may provide direct current power, and the power converter 160 may convert, into alternating current power, the direct current power provided by the battery 140 and transfer the alternating current power to the induction heating unit 130.

The induction heating unit 130 may include at least one coil. For example, as shown in FIG. 7A, the induction heating unit 130 may only include a first coil 131. In another embodiment, as shown in FIGS. 7B and 7C, the induction heating unit 130 may include the first coil 131 and a second coil 132.

The induction heating unit 130 may further include a capacitor connected in series or in parallel to a coil. In one embodiment, the induction heating unit 130 may include a first capacitor connected in series or in parallel to the first coil 131. In another embodiment, the induction heating unit 130 may include a first capacitor connected in series or in parallel to the first coil 131 and a second capacitor connected in series or in parallel to the second coil 132. Hereinafter, a capacitor will be illustrated as being connected in series to a coil, but the description below may be applicable even when a capacitor is connected in parallel to a coil.

The controller 150 may control a driving frequency of the induction heating unit 130. In a series resonance circuit, a current flowing through the first coil 131 and/or the second coil 132 may be highest at a resonance frequency. The controller 150 may heat the susceptor 110 or detect the temperature of the susceptor 110 by controlling the driving frequency of the induction heating unit 130. For example, the controller 150 may heat the susceptor 110 via the first coil 131 and detect the temperature of the susceptor 110 via the second coil 132. In some embodiments, the controller 150 may heat the susceptor 110 and detect the temperature of the susceptor 110 via the first coil 131 alone.

The memory 170 may store, in the form of a lookup table, matching data between a resonance frequency and the temperature of the susceptor 110 or matching data between a change in the resonance frequency and the temperature of the susceptor 110. The controller 150 may calculate the temperature of the susceptor 110 on the basis of the lookup table stored in the memory 170.

An example in which the controller 150 controls the first coil 131 and the second coil 132 will be described later with reference to FIGS. 9 through 12. An example in which the controller 150 controls the first coil 131 alone will be described later with reference to FIGS. 13 and 14.

The internal structure of the aerosol generating device 100 is not limited to that shown in FIG. 8. It may be understood by one of ordinary skill in the art that, according to the design of the aerosol generating device 100, some of hardware components shown in FIG. 8 may be omitted or new components may be further included.

Figure 9:
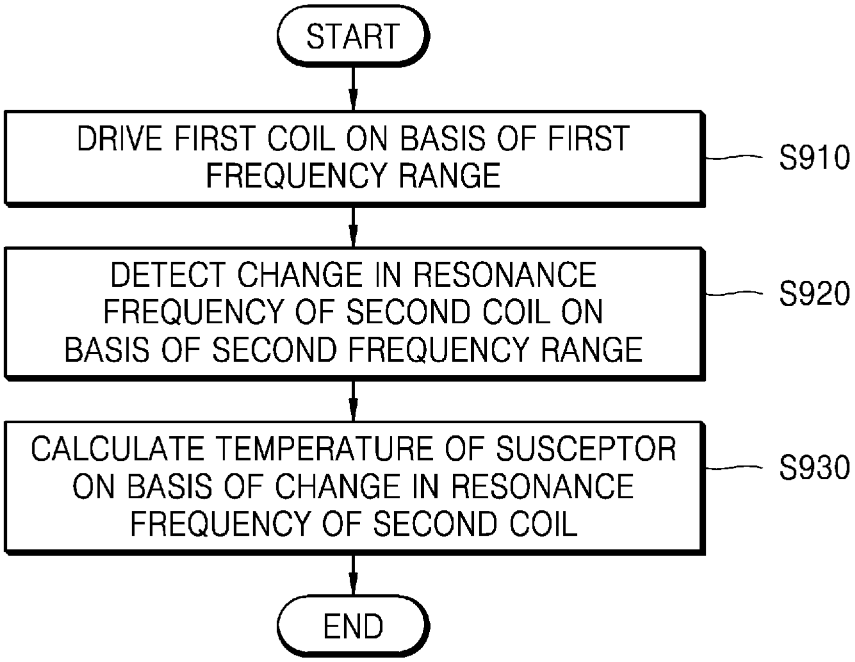
FIG. 9 is a flowchart illustrating a method of operating an aerosol generating device, according to an embodiment.
Figure 10:
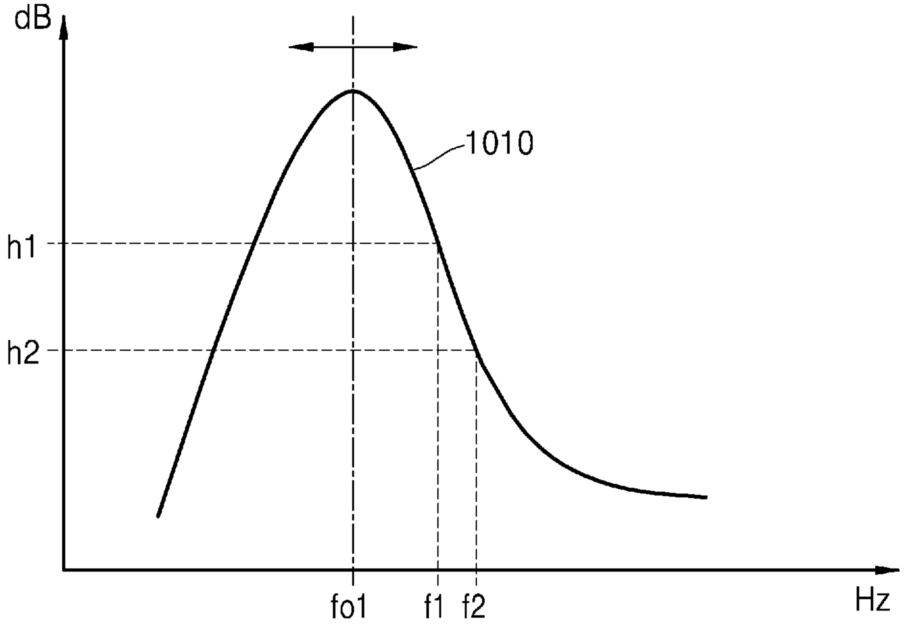
FIGS. 10 through 12 illustrate frequency response characteristics of a coil according to embodiments.
Figure 11:
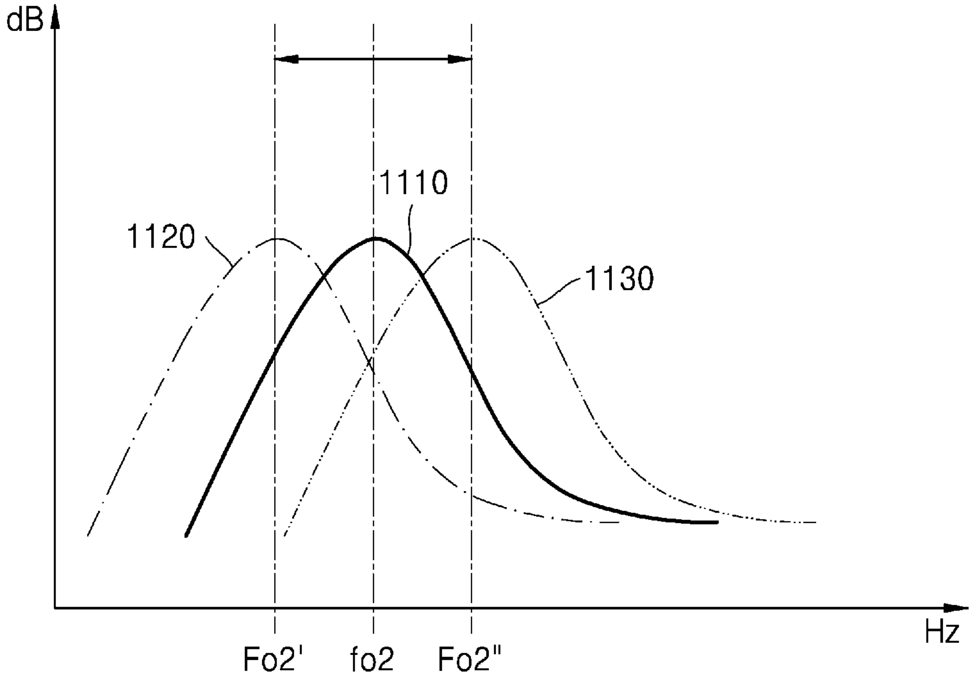
Figure 12:
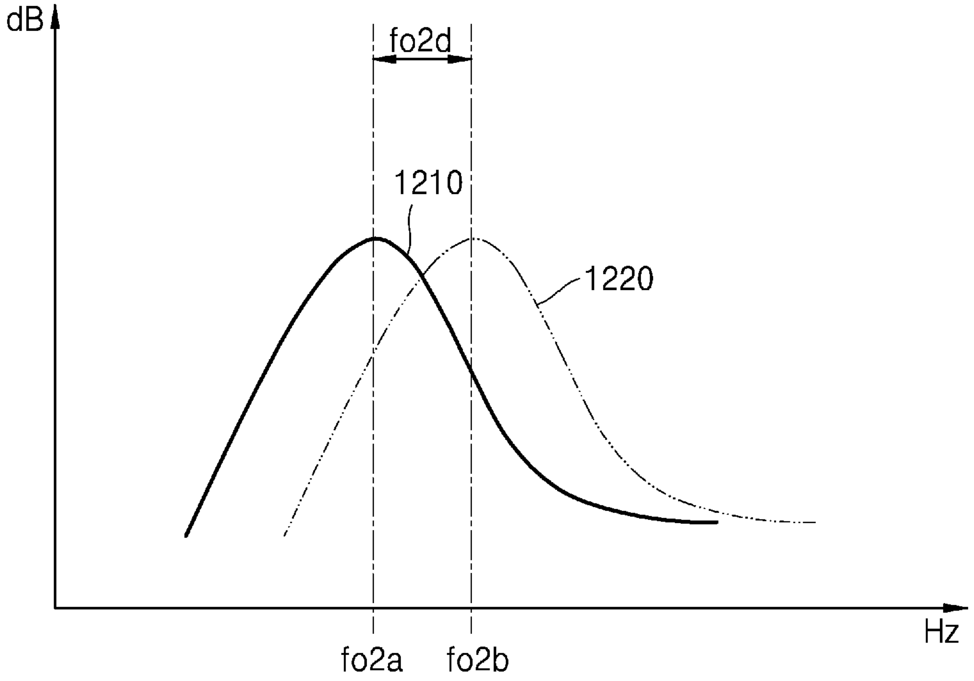

FIG. 9 is a flowchart illustrating a method of operating an aerosol generating device, according to one embodiment. FIGS. 10 through 12 illustrate frequency response characteristics of coils according to an embodiment.

Referring to FIG. 9, in operation S910, the controller 150 may drive the first coil 131 on the basis of a first frequency range.

A current applied to the first coil 131 may vary according to a first driving frequency for driving the first coil 131.

In detail, FIG. 10 illustrates a frequency response 1010 of the first coil 131. As shown in FIG. 10, the measured gain of the first coil 131 may be greatest at a first resonance frequency fo1. In other words, the current flowing in the first coil 131 may be highest at the first resonance frequency fo1. The first resonance frequency fo1 may be determined by the first coil 131 and a first capacitor connected in series to the first coil 131.

Also, the gain of the first coil 131 may gradually decrease as a frequency increases beyond the first resonance frequency fo1. For example, the gain h1 of the first coil 131 at a first frequency f1 that is greater than the first resonance frequency fo1 may be greater than the gain h2 of the first coil 131 at a second frequency f2 that is greater than the first frequency f1.

The controller 150 may control the current flowing in the first coil 131 by varying a first driving frequency within a preset first frequency range. When the current flowing in the first coil 131 varies, the temperature of an aerosol generating substrate or the susceptor 110 provided in the aerosol generating device 100 may also vary. The aerosol generating substrate may be the cigarette 200 of FIGS. 3 and 4. For example, the controller 150 may supply maximum power to the first coil 131 by setting the first driving frequency to the first resonance frequency fo1 such that the susceptor 110 is heated to the highest temperature. As another example, the controller 150 may supply the first coil 131 with first power that is less than the maximum power by setting the first driving frequency to the first frequency f1 that is greater than the first resonance frequency fo1. Accordingly, the temperature of the susceptor 110 may be changed to a first temperature less than the highest temperature. As another example, the controller 150 may supply the first coil 131 with second power that is less than the first power by setting the first driving frequency to the second frequency f2 that is greater than the first frequency f1. Accordingly, the temperature of the susceptor 110 may be changed to a second temperature that is less than the first temperature.

In operation S920 of FIG. 9, the controller 150 may detect a change in a resonance frequency of a second coil on the basis of a second frequency range.

In detail, FIG. 11 illustrates frequency responses 1110, 1120, and 1130 of the second coil 132 according to a change in the temperature of the susceptor 110. As shown in FIG. 11, when the susceptor 110 is at a first temperature, a gain of the second coil 132 may be greatest at a second resonance frequency fo2. The second resonance frequency fo2 may be determined by the second coil 132 and a second capacitor connected in series to the second coil 132.

Also, as the temperature of the susceptor 110 increases, the second resonance frequency fo2 of the second coil 132 may increase to Fo2" or may decrease to Fo2'. In other words, a frequency at which the highest current is output may vary according to the temperature of the susceptor 110. The controller 150 may sweep a second driving frequency of the second coil 132 within the second frequency range and detect the second resonance frequency fo2 of the second coil 132 on the basis of the result of sweeping the frequency. For example, the controller 150 may determine, as a second resonance frequency, a driving frequency at which the current flowing in the second coil 132 is highest.

When the second frequency range overlaps the first frequency range, the susceptor 110 may also be heated by the second coil 132. This unexpected heating by the second coil 132 may lead to inaccurate control of the temperature of the susceptor 110. Therefore, the second resonance frequency fo2 may be set to be lower than the first resonance frequency fo1. Also, the second frequency range may be set to be different from the first frequency range. For example, the lower limit of the first frequency range may be set to be greater than the upper limit of the second frequency range. As another example, the susceptor 110 may be heated up to a first heating temperature at the lower limit of the first frequency range, and may be heated up to a second heating temperature, which is lower than the first heating temperature, at the upper limit of the second frequency range. The second heating temperature may be a temperature at which an aerosol is not generated.

If the upper limit of the second frequency range affects a change in the temperature of the susceptor 110, the temperature of the susceptor 110 may vary even during the frequency sweep of the second coil 132. In this respect, the upper limit of the second frequency range may be set to a frequency that does not affect a change in the temperature of the susceptor 110. For example, when the first frequency range is 2 MHz to 4 MHz, the second frequency range may be set to 0.1 MHz to 0.3 MHz but is not limited thereto.

In operation S930 of FIG. 9, the controller 150 may calculate the temperature of the susceptor 110 on the basis of the change in the resonance frequency of the second coil 132.

In detail, FIG. 12 illustrates frequency responses (e.g., a first frequency response 1210 and a second frequency response 1220) of the second coil 132 according to a change in the temperature of the susceptor 110. As the temperature of the susceptor 110 varies, a frequency response of the second coil 132 varies from the first frequency response 1210 to the second frequency response 1220.

As shown in FIG. 12, as the susceptor 110 is heated, a resonance frequency of the second coil 132 may change from a third resonance frequency fo2*a* detected at a first time point to a fourth resonance frequency fo2*b* detected at a second point time. The controller 150 may calculate the temperature of the susceptor 110 on the basis of a resonance frequency difference fo2*d* between the third resonance frequency fo2*a* and the fourth resonance frequency fo2*b*.

For example, the controller 150 may calculate the temperature of the susceptor 110 on the basis of matching data between the resonance frequency difference fo2*d* and the temperature of the susceptor 110. The matching data between the resonance frequency difference fo2*d* and the temperature of the susceptor 110 may be previously stored in the form of a lookup table in the memory 170.

Figure 13:
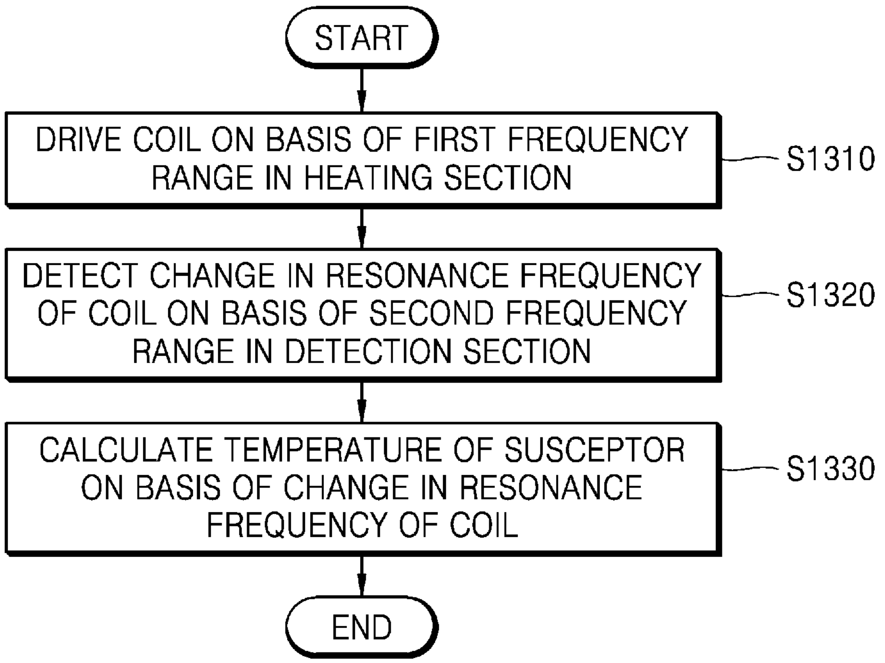
FIG. 13 is a flowchart illustrating a method of operating an aerosol generating device, according to another embodiment.
Figure 14:
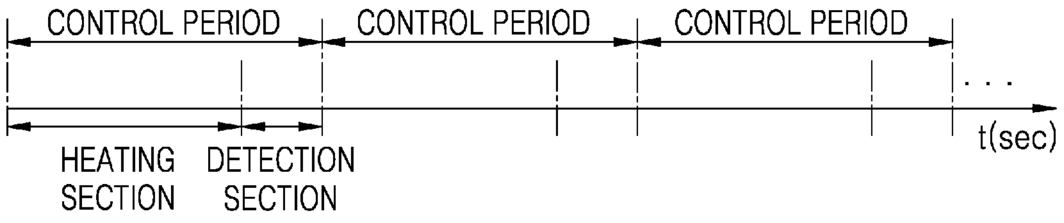
FIG. 14 illustrates a timing diagram for operating an induction heating unit according to an embodiment.

FIG. 13 is a flowchart illustrating a method of operating an aerosol generating device, according to another embodiment. FIG. 14 is a timing diagram for operating an induction heating unit according to an embodiment.

In the present embodiment, unlike the embodiments described above with reference to FIGS. 9 through 12, the aerosol generating device 100 heats the susceptor 110 and calculates the temperature of the susceptor 110, with a single coil. Hereinafter, for convenience of description, the first coil 131 will be referred to as a coil 131.

As shown in FIG. 14, the controller 150 may control the coil 131 according to a preset control period. Each control period may include a heating section and a detection section. The controller 150 may heat an aerosol generating substrate or the susceptor 110 provided in the aerosol generating device 100 via the coil 131 in the heating section and calculate the temperature of the susceptor 110 via the coil 131 in the detection section.

In detail, in operation S1310 of FIG. 13, the controller 150 may drive the coil 131 on the basis of a first frequency range in a heating section.

The method of driving the coil 131 in the heating section may be similar to the method of driving the first coil 131 described above with reference to FIGS. 9 and 10. In other words, the controller 150 may control a current flowing in the coil 131 by varying a driving frequency within a preset first frequency range. When the current applied to the coil 131 varies, the temperature of an aerosol generating substrate or the susceptor 110 provided in the aerosol generating device 100 may also vary.

In operation S1320, the controller 150 may detect a change in a resonance frequency of the coil 131 on the basis of a second frequency range in a detection section.

The method of detecting the change in the resonance frequency of the coil 131 in the detection section may be similar to the detection method described above with reference to FIGS. 9 and 11. In other words, the controller 150 may sweep a driving frequency of the coil 131 within the second frequency range and detect a resonance frequency of the coil 131 on the basis of the result of sweeping the driving frequency. For example, the controller 150 may sweep the driving frequency of the coil 131 within the second frequency range and determine, as a resonance frequency, a driving frequency detected when the current flowing in the coil 131 is highest.

Unlike the aerosol generating device 100 described with reference to FIGS. 9 through 12, the aerosol generating device 100 described with reference to FIGS. 13 and 14 may heat the susceptor 110 and calculate the temperature of the susceptor 110, by using a single coil. Therefore, a first frequency range may be set to be the same as a second frequency range. For example, a first frequency range and a second frequency range may be each set to 2 MHz to 4 MHz but are not limited thereto.

The heating section may be set to be longer than the detection section. Accordingly, a change in the temperature of the susceptor 110 may be minimized, and the temperature of the susceptor 110 may be accurately measured.

In operation S1330, the controller 150 may calculate the temperature of the susceptor 110 on the basis of the change in the resonance frequency of the coil 131.

The method of calculating the temperature of the susceptor 110 in the detection section may be similar to the calculation method described with reference to FIGS. 9 through 12. In other words, the controller 150 may calculate the temperature of the susceptor 110 on the basis of a resonance frequency difference between a fifth resonance frequency of the coil 131 detected at a first time point and a sixth resonance frequency detected at a second time point.

The controller 150 may calculate the temperature of the susceptor 110 on the basis of matching data between the resonance frequency difference and the temperature of the susceptor 110. The matching data between the resonance frequency difference and the temperature of the susceptor 110 may be stored in the form of a lookup table in the memory 170.

At least one of the components, elements, modules or units (collectively "components" in this paragraph) represented by a block in the drawings, such as the controller 150 in FIG. 8, may be embodied as various numbers of hardware, software and/or firmware structures that execute respective functions described above, according to an exemplary embodiment. For example, at least one of these components may use a direct circuit structure, such as a memory, a processor, a logic circuit, a lookup table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

One of ordinary skill in the art related to the present embodiments may understand that various changes in form and details can be made therein without departing from the scope of the characteristics described above. The disclosed methods should be considered in descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An aerosol generating device comprising:

a susceptor configured to be inserted into an aerosol generating substrate;

a first coil configured to induce heat in the susceptor by induction heating;

a second coil having a resonance frequency which varies according to a change in a temperature of the susceptor; and a controller configured to calculate the temperature of the susceptor based on a change in the resonance frequency of the second coil, wherein a first frequency range for driving the first coil is different from a second frequency range for driving the second coil.

2. The aerosol generating device of claim 1, wherein the controller sweeps a driving frequency of the second coil within the second frequency range and detects the change in the resonance frequency of the second coil based on a result of sweeping the driving frequency.

3. The aerosol generating device of claim 1, wherein the controller calculates the temperature of the susceptor based on a difference between a first resonance frequency of the second coil detected at a first time point and a second resonance frequency detected at a second time point.

4. The aerosol generating device of claim 1, wherein a lower limit of the first frequency range is higher than an upper limit of the second frequency range.

5. The aerosol generating device of claim 1, wherein the susceptor protrudes from a bottom of an accommodation space in which the aerosol generating substrate is accommodated, and the first coil and the second coil surround the accommodation space.

6. The aerosol generating device of claim 5, wherein the first coil and the second coil are alternately wound in a longitudinal direction of the accommodation space.

7. The aerosol generating device of claim 5, wherein the first coil and the second coil surround different portions of the accommodation space.

8. An aerosol generating device comprising:

a susceptor configured to be inserted into an aerosol generating substrate;

a coil configured to induce heat in the susceptor by induction heating and have a resonance frequency which varies according to a change in a temperature of the susceptor; and a controller configured to calculate the temperature of the susceptor based on a change in the resonance frequency of the coil and control the coil based on a preset control period, wherein the preset control period includes a heating section for heating the susceptor by driving the coil and a detection section for detecting the change in the resonance frequency of the coil by driving the coil, and wherein the heating section is set to be longer than the detection section.

9. The aerosol generating device of claim 8, wherein a first frequency range for driving the coil in the heating section is different from a second frequency range for driving the coil in the detection section.

10. The aerosol generating device of claim 8, wherein the controller sweeps a driving frequency of the coil within a preset frequency range and detects the change in the resonance frequency of the coil based on a result of sweeping the driving frequency.

11. The aerosol generating device of claim 8, wherein the controller calculates the temperature of the susceptor based on a difference between a first resonance frequency of the coil detected at a first time point and a second resonance frequency detected at a second point time.

12. The aerosol generating device of claim 8, wherein a first frequency range for driving the coil in a heating section is the same as a second frequency range for driving the coil in a detection section.

13. The aerosol generating device of claim 8, wherein the susceptor protrudes from a bottom of an accommodation space in which the aerosol generating substrate is accommodated, and the coil surrounds an outer surface of the accommodation space.

14. An aerosol generating system comprising:

an aerosol generating substrate comprising a susceptor; and an aerosol generating device comprising:

an induction heating unit configured to heat the susceptor by induction heating and have a resonance frequency which varies according to a change in a temperature of the susceptor; and a controller configured to calculate the temperature of the susceptor based on a change in the resonance frequency of the induction heating unit and control the induction heating unit based on a preset control period, wherein the preset control period includes a heating section for heating the susceptor by driving the induction heating unit and a detection section for detecting the change in the resonance frequency of the induction heating unit by driving the induction heating unit, and wherein the heating section is set to be longer than the detection section.

* * * * *